United States Patent
Hodebourg et al.

(10) Patent No.: US 9,145,854 B2
(45) Date of Patent: Sep. 29, 2015

(54) METHOD FOR CONTROLLING AN EGR CIRCUIT IN A MOTOR VEHICLE ENGINE

(75) Inventors: Grégory Hodebourg, Sartrouville (FR); Sébastien Adenot, Pontoise (FR)

(73) Assignee: Valeo Systemes de Controle Moteur, Cergy St. Christophe (FR)

( * ) Notice: Subject to any disclaimer, the term of this patent is extended or adjusted under 35 U.S.C. 154(b) by 454 days.

(21) Appl. No.: 13/518,073

(22) PCT Filed: Dec. 22, 2010

(86) PCT No.: PCT/EP2010/070595
§ 371 (c)(1),
(2), (4) Date: Sep. 5, 2012

(87) PCT Pub. No.: WO2011/076901
PCT Pub. Date: Jun. 30, 2011

(65) Prior Publication Data
US 2013/0000615 A1    Jan. 3, 2013

(30) Foreign Application Priority Data
Dec. 22, 2009 (FR) ..................................... 09 06248

(51) Int. Cl.
*F02M 25/07* (2006.01)
*F02D 41/00* (2006.01)

(52) U.S. Cl.
CPC ....... *F02M 25/0754* (2013.01); *F02D 41/0077* (2013.01); *F02M 25/0786* (2013.01);
(Continued)

(58) Field of Classification Search
CPC ....... Y02T 10/12–10/148; Y02T 10/40–10/48; Y02T 10/121; Y02T 10/47; Y02T 10/144; F02M 25/0709; F02D 2009/0276
USPC ........................ 123/568.11, 568.17–568.19, 123/568.23–568.24, 681, 683, 684, 698, 123/188.7, 568.12–568.24; 29/888.01; 137/484
See application file for complete search history.

(56) References Cited

U.S. PATENT DOCUMENTS 3,232,315 A * 2/1966 Morelli ......................... 137/521
4,385,496 A * 5/1983 Yamane ......................... 60/599
(Continued)

FOREIGN PATENT DOCUMENTS

EP    0 900 930 A2    3/1999
EP    0 992 668 A2    4/2000
(Continued)

OTHER PUBLICATIONS

International Search Report w/translation for PCT/EP2010/070595 dated Feb. 9, 2011, 6 pages.

*Primary Examiner* — Stephen K Cronin
*Assistant Examiner* — Susan E Scharpf
(74) *Attorney, Agent, or Firm* — Osha Liang LLP

(57) ABSTRACT

The invention relates to a method for controlling an exhaust gas recirculation circuit for an internal combustion engine of a motor vehicle. The engine is linked to an air intake circuit and to a gas exhaust circuit linked to the air intake circuit by the recirculation circuit. A first valve controls the flow of air upstream from the recirculation circuit, and a second valve controls the flow of exhaust gases that are recirculated within the recirculation circuit. The method comprises the following steps: a) the first valve is closed, and the second valve is gradually opened; b) if the second valve is opened at an angle greater than a value between 25° and 35°, the first valve is gradually opened concomitantly to the opening of the second valve. As a result of the invention, the EGR rate is easily controllable.

5 Claims, 4 Drawing Sheets

(52) U.S. Cl.
CPC .... *F02M25/0793* (2013.01); *F02D 2041/0017* (2013.01); *F02D 2200/0404* (2013.01); *F02M 25/0709* (2013.01); *F02M 25/0727* (2013.01); *F02M 25/0773* (2013.01); *Y02T 10/47* (2013.01)

(56) References Cited

U.S. PATENT DOCUMENTS

| | | | | |
|---|---|---|---|---|
| 4,749,004 | A * | 6/1988 | Peash | 137/865 |
| 5,427,141 | A * | 6/1995 | Ohtsubo | 137/595 |
| 5,562,085 | A * | 10/1996 | Kosuda et al. | 123/568.24 |
| 6,564,784 | B1 * | 5/2003 | Onodera et al. | 123/568.12 |
| 6,925,992 | B1 * | 8/2005 | Eriksson et al. | 123/568.12 |
| 7,140,392 | B2 * | 11/2006 | Blomquist et al. | 137/637.3 |
| 7,163,005 | B2 * | 1/2007 | Tussing et al. | 123/568.12 |
| 8,381,520 | B2 * | 2/2013 | Leroux et al. | 60/605.2 |
| 8,561,645 | B2 * | 10/2013 | Leroux et al. | 137/637.1 |
| 2003/0188727 | A1 | 10/2003 | van Nieuwstadt | |
| 2010/0089370 | A1 * | 4/2010 | Furukawa et al. | 123/568.12 |
| 2012/0024268 | A1 * | 2/2012 | De Almeida et al. | 123/568.11 |
| 2013/0025575 | A1 * | 1/2013 | Vitiello et al. | 123/568.2 |
| 2013/0047967 | A1 * | 2/2013 | Hodebourg et al. | 123/568.15 |

FOREIGN PATENT DOCUMENTS

| | | |
|---|---|---|
| EP | 1 136 688 A2 | 9/2001 |
| FR | 2 900 455 A1 | 11/2007 |
| FR | 2 926 114 A1 | 7/2009 |
| FR | 2 926 126 A1 | 7/2009 |
| JP | 2008 101579 A | 5/2008 |

* cited by examiner

METHOD FOR CONTROLLING AN EGR CIRCUIT IN A MOTOR VEHICLE ENGINE

The invention relates to a method of controlling an exhaust gas recirculation circuit of a motor vehicle internal combustion engine.

A motor vehicle internal combustion engine comprises a combustion chamber, generally formed by a plurality of cylinders, in which a mixture of oxidant and of fuel is burnt to generate the work of the engine. The oxidant contains air, which may or may not be compressed, depending on whether or not the engine has a compressor; when it is compressed, it is referred to as supercharging air. The air (often denoted "fresh air") may moreover be mixed with exhaust gases; these are referred to as recirculated exhaust gases, this mode of operation being typically known by those skilled in the art by the English-language acronym EGR, which stands for "Exhaust Gas Recirculation". The gases admitted to the combustion chamber are known as inlet gases; the inlet gases may therefore be made of fresh air alone, or of a mixture of fresh air and of exhaust gases; the flow rate of the inlet gases can be regulated by a valve of the butterfly-valve type which is controlled as a function of the extent to which the vehicle throttle pedal is depressed to regulate the engine speed.

In the case of an engine that has compression means such as a compressor or turbocompressor, the air is admitted to the engine intake circuit, is compressed by the compressor, is cooled and admitted to the cylinders where it is burnt with the fuel then removed via the exhaust lines. The exhaust gases drive a turbine, attached to the compressor and therewith forming the turbocompressor. The exhaust gas recirculation may be what is known as "low-pressure" recirculation, when performed on exhaust gases bled off after the turbine and re-injected before the compressor, or "high-pressure" recirculation when it is performed on gases bled off before the turbine and reinjected after the compressor; the two types of recirculation may be combined. By way of example, low-pressure recirculation makes it possible, in the case of a gasoline engine, to reduce the exhaust temperature (and therefore the fuel consumption because there is therefore no need to enrich the combustion mixture too greatly) and avoid the phenomena of pinging at high engine compression ratios; in the case of a diesel engine, it allows a reduction in pollution in order to meet environmental standards.

In the case of a low-pressure exhaust gas recirculation loop for example, a valve known as a "three-way valve" is generally provided to control the level of EGR, which means the proportion of recirculated exhaust gases in the total flow rate of inlet gas entering the engine. Such a three-way valve has two inlet ducts, one for the fresh air and the other for the recirculated exhaust gases (in what follows, the recirculated exhaust gases will sometimes be referred to as "EGR gases"); the EGR gases are generally cooled before they are mixed with the fresh air. The three-way valve also comprises an outlet duct communicating with the inlet ducts to receive the fresh air and/or the EGR gases; this outlet duct opens for example into the compressor from where the gases are guided into a cooler (or along a path bypassing this cooler) before being admitted to the engine. Of course, the three-way valve may be replaced by two simple valves one of them located in the fresh air intake duct and the other in the exhaust gas recirculation duct. The flow rate of gas passing through a valve is regulated by a shut-off means such as a shutter or a butterfly.

It has been seen that several modes of operation of the three-way valve and therefore of the engine can be envisioned. It is possible for the engine to receive only fresh air, without EGR gases, or to receive a mixture of fresh air and of EGR gases, the pressure difference between the exhaust and the intake side of the engine being enough to cause the recirculation of the exhaust gases. When the pressure difference is not great enough to cause the recirculation of the exhaust gases and in order to ensure the correct level of EGR, it is possible to create a back pressure by throttling the exhaust path downstream of the EGR loop in order thus to force some of the exhaust gases to the engine intake path. This solution, because of its complexity, is not, however, very satisfactory, and the invention of the present application is another solution to the problem of creating a back pressure in order to ensure the correct EGR flow rate.

Thus, the invention relates to a method of controlling an exhaust gas recirculation circuit of a motor vehicle internal combustion engine, the engine being connected to an air intake circuit and to an exhaust gas circuit connected to the gas by the recirculation circuit, a first valve regulating the airflow rate upstream of the recirculation circuit and a second valve regulating the flow rate of recirculated exhaust gases in the recirculation circuit, the method being characterized in that it comprises the following steps:

a) with the first valve open, the second valve is progressively opened;
b) if the second valve is open by an angle greater than a value of between 25° and 35°, the first valve is progressively closed concomitantly with the opening of the second valve.

By virtue of the invention, the level of EGR can be increased appreciably through the closing of the air valve which creates a phenomenon of EGR gas aspiration. Control over this level of EGR is also made easier. Specifically, choosing an angle of between 25° and 35° at which to begin closing the air shutter has the effect that the curve of level of EGR against angle of opening of the EGR valve increases constantly, with no appreciable slowing, which means to say that its second derivative is practically always positive. It is therefore possible to control the level of EGR directly using the opening of the EGR valve, and in an effective way.

The invention is particularly advantageous for controlling low-pressure exhaust gas recirculation in a diesel engine. That allows for more linear and progressive regulation of the level of EGR as a function of valve opening, thus improving the precision with which the valve and therefore the level of EGR can be controlled.

According to one embodiment, the opening of the second valve is interrupted at an angle of opening of between 65 and 85°, the first valve then being fully closed.

Thus, the range of closure of the first valve is rapid.

According to one embodiment, the first valve is designed so that when closed it allows a leakage air current to pass.

This makes it possible to ensure a minimum level of fresh air for the engine to operate.

According to one embodiment, the first and second valves are arranged in a three-way valve comprising an inlet port with the first valve, an inlet port with the second valve and an outlet port communicating directly or indirectly with an intake manifold that admits gas to the engine.

Such an embodiment is compact and easy to operate.

According to one embodiment in this case, with the three-way valve having a single drive motor for driving the first valve and the second valve, the three-way valve has at least two modes of operation:
 a first mode in which the rotation of the motor causes the opening or the closing of the second valve, without driving the first valve which is open, and
 a second mode in which the rotation of the motor leads to the closing of the first valve concomitantly with the opening of the second valve, the closing of the first valve being begun when the angle of opening of the second valve passes through an angle of between 25° and 35°.

The invention will be better understood with the aid of the following description of the preferred embodiment of the control method of the invention, with reference to the attached plates of drawings in which.

Figure 1:
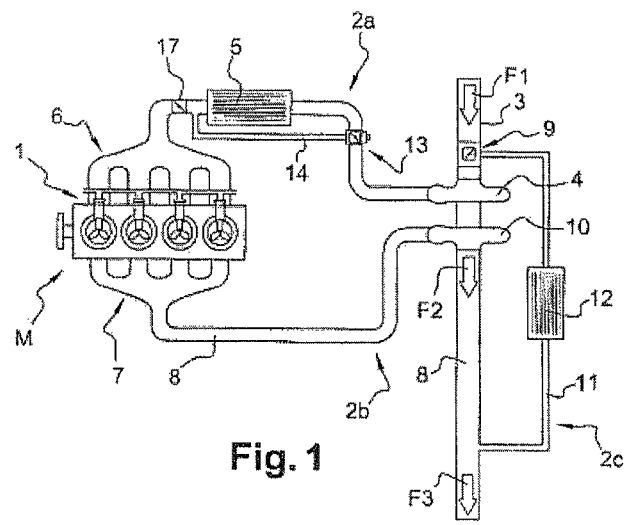
FIG. 1 is a schematic depiction of an engine allowing implementation of the preferred embodiment of the control method of the invention and of its intake, exhaust and recirculation circuits.

With reference to FIG. 1, a motor vehicle internal combustion engine M comprises a combustion chamber 1 having a plurality of cylinders, in this instance four of these, and intended to receive a mixture of oxidant and of fuel (in this instance diesel) of which the combustion in the cylinders generates the work of the engine M. The operation of the engine M is conventional: the gases are admitted to the combustion chamber 1, where they are compressed, burnt and then expelled in the form of exhaust gases; these are the conventional four strokes of a combustion engine (induction, compression, power and exhaust).

The intake circuit 2a that admits gases to the engine M comprises an air intake pipe 3 admitting charge air or fresh air (the flow of which is depicted by the arrow F1), a compressor 4 for the charge gases, which in this instance is a turbocompressor, and a heat exchanger 5, for cooling the gases leaving the compressor 4. This heat exchanger 5 is commonly known by those skilled in the art by its acronym "CAC" which stands for "charge air cooler"; its function is effectively to cool the inlet gases, particularly the air, which is said to be supercharged because it is compressed. On leaving the CAC 5, the gases enter an intake manifold 6 that admits the gases to the combustion chamber 1 of the engine M, forming a header box for the gases in the cylinder head of the engine M. In this particular instance, the intake circuit 2a comprises a bypass 14 bypassing the path containing the CAC 5, the gases entering the cooled path and those entering the uncooled path 14 being regulated by a valve 13, in a way known per se. Upstream of the intake manifold 6 that admits the gases to the engine M, the intake circuit comprises a valve 17 comprising a shutter of the butterfly type, the function of which is to regulate the gas flow rate in order to regulate engine speed in the case of a gasoline engine. In the case of a diesel engine, the butterfly 17 is generally referred to as the "choke"; this butterfly valve 17 is controlled by an engine control unit (typically denoted by its English-language acronym of ECU), well-known to those skilled in the art.

The gas exhaust circuit 2b comprises, at the exit from the combustion chamber 1 of the engine M, an exhaust gas manifold 7 connected to a path or pipe 8 for exhausting the gases.

The exhaust circuit 2b also comprises a turbine 10, rotating as one with the inlet gas compressor 4, and therewith forming a turbocompressor. The turbine 10 is driven by the exhaust gases of the exhaust path 8, the flow of which is depicted schematically by the arrow F2.

Finally, the exhaust circuit 2b is connected to an exhaust gas recirculation circuit 2c comprising a line for guiding the recirculated exhaust gases ("EGR gases") in order to bleed exhaust gases from the exhaust circuit 2b, near the outlet thereof, and reinject them into the intake circuit 2a, in this instance upstream of the compressor 4, at a valve 9 which in this instance is a three-way valve 9 that will be referred to hereinafter as the EGR valve 9 and which forms the site or region of connection of the recirculation circuit 2c to the intake circuit 2a. Such exhaust gas recirculation is said to be low-pressure recirculation because it is performed on exhaust gases leaving the exhaust circuit 2b (downstream of the turbine 10) which are at a relatively low pressure. A cooler 12 for these recirculated exhaust gases is also provided in the recirculation circuit 2c. Those gases which are not recirculated form the exhaust gases of the vehicle, the flow of which gases is denoted by the arrow F3.

The EGR valve 9 has a charge air inlet port 9a (or duct 9a) an EGR gas inlet port 9b (or duct 9b) and a gas outlet port 9c (or duct 9c) for the gases which form the inlet gases (and the composition of which varies according to the flow rate of the gases from the air and EGR gas inlet ports 9a, 9b). The EGR valve 9 comprises a shutter 15 in its air inlet port 9a (hereinafter referred to as the "air shutter 15") and a shutter 16 in its EGR gas inlet port 9b (hereinafter referred to as the "EGR gas shutter 16"). Functionally, and as can be seen particularly clearly in FIGS. 2a to 2c, the EGR valve 9 therefore performs the function of two valves, one of them regulating the fresh air flow rate and the other the EGR gas flow rate.

Four modes of operation of the EGR valve 9 are set out hereinbelow in general terms, it being possible for the implementation of these modes of operation and, in particular, the ratio between the degrees of opening of the shutters 15, 16 to vary depending on the embodiment of the EGR valve 9.

Figures 2A, 2B, 2C, 2D:
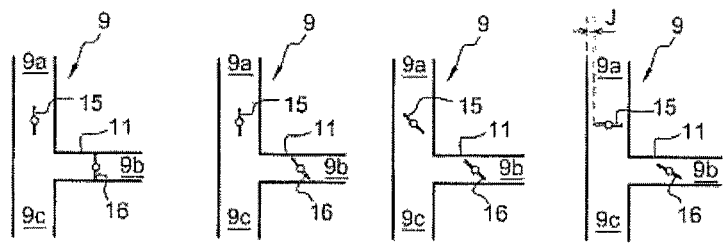
FIGS. 2a, 2b, 2c and 2d depict four modes of use of the EGR valve of FIG. 1 for implementing the preferred embodiment of the control method of the invention.

In a first mode of operation of the EGR valve 9 which mode is depicted in FIG. 2a and corresponds to the engine M operating with no exhaust gas recirculation (of use, for example, if the engine is operating in a particularly cold environment), the air shutter 15 is open (wide open or partially open) and the EGR gas shutter 16 is closed, thus completely blocking off the recirculation line 11.

In a second mode of operation of the EGR valve 9, which mode is depicted in FIG. 2b and which corresponds to the start of operation of the engine M with exhaust gas recirculation, the EGR gas shutter 16 is progressively opened while the air shutter 15 remains wide open. Some of the exhaust gases are thus mixed with the fresh air in the inlet gases.

In a third mode of operation of the EGR valve 9 which mode is depicted in FIG. 2c, the EGR gas shutter 16 is progressively opened while the air shutter 15 is progressively closed concomitantly. Partial closure of the air shutter 15 combines with the opening of the EGR shutter 16 to increase the EGR gas flow rate through the phenomenon of the EGR gases being aspirated because of the reduction in the fresh air flow rate. This third mode of operation is commenced, in accordance with the invention, from an EGR shutter 16 angle of opening of between 25° and 35°, in this instance 28° as will be seen later on.

In a fourth mode of operation of the EGR valve 9 which mode is depicted in FIG. 2d, the EGR gas shutter 16 is partially opened (and in its state of maximum opening of the dynamics assigned to it) and the air shutter 15 is closed. The level of EGR is thus at its maximum. According to the embodiment described, the air shutter 15 is configured in such a way that its diameter is smaller than that of the line across which it extends in order to leave a clearance "J" between its edges and the internal surface of the wall of said line. This clearance J allows a fresh air leakage current to pass thus guaranteeing a minimum flow rate of air to the engine M to allow it to operate in this fourth mode of operation of the EGR valve 9.

In the preferred embodiment of the invention that is set with reference to FIGS. 5a, 5b, 6a and 6b, the EGR valve 9 comprises a single motor 18 for operating its two shutters 15, 16; in this instance it is a DC motor. The EGR valve 9 comprises gearing extending from the shaft 19 of the motor 18 as far as two drive shafts 20, 21 that drive the rotation of the air shutter 15 and of the EGR gas shutter 16 respectively. In this particular instance, these drive shafts 20, 21 are parallel to one another and to the shaft 19 of the motor 18.

Secured to the shaft 19 of the motor 18 is a pinion 22 that drives an intermediate gearwheel 23 bearing a peripheral toothset 24 and a central toothset 25 (these toothsets 24, 25 are superposed and concentric). The peripheral toothset 24 of the intermediate wheel 23 meshes with a ring gear 26 of a mechanism 28 that drives the rotation of the air shutter 15. The central toothset 25 of the intermediate wheel 23 meshes with a ring gear 27 for driving the rotation of the EGR gas shutter 16.

In the example considered, the motor 18, via its pinion 22, if driven in the counterclockwise direction, drives the intermediate wheel 23 in the clockwise direction. In its turn, the intermediate wheel 23, via its toothsets 24, 25, drives the ring gears 26, 27 that turn the two shutters 15, 16 in the counterclockwise direction. #10

The EGR shutter 16 is continuously driven in rotation by the rotation of its driving toothset 27, with no disengagement whatever its position. It can adopt all positions between its closed position (corresponding to its driving toothset 27 resting against a first end stop 33) and a position of opening by an angle in this instance equal to 68° (corresponding to its driving toothset 27 resting against a second end stop 34).

The driving mechanism 28 that drives the air shutter 15 comprises a disengagement system designed so that the rotation of the ring gear 26 does not cause the drive shaft 20 that drives the shutter 15 to rotate over a first part of its travel and does cause it to rotate over the second half of its travel. For this, in this particular instance, the mechanism 28 comprises a wheel 29 carrying the ring gear 27 and in which there is formed an opening forming a sector in the wheel 29, this sector creating a bearing a drive surface 30. The mechanism 28 also comprises a drive finger 31 (conventionally known as "driver" 31) which rotates as one with the drive shaft 21 that drives the shutter 16. The air shutter 15 is driven in rotation only if the drive surface 30 of the wheel 29 rests against the finger 31 and drives its rotation. Thus, in the position of FIG. 6a, a rotation of the wheel 29 in the counterclockwise direction causes no movement of the finger 31 or therefore of the shutter 15, because such resting of the finger is not achieved; by contrast, as soon as the drive surface 30 of the wheel 29 comes to rest against the finger 31, as in the position of FIG. 6b for example, the wheel 29 drives the shutter 15 in rotation. If the wheel 29 is rotated in the clockwise direction from a position in which the drive surface 30 and the finger 31 rest against one another, the shutter 15 accompanies the movement of the wheel 29, thanks to a spring which returns the finger 31 against the drive surface 30, as far as an end stop 32 for the finger 31 that defines its default position, i.e. the open position of the air shutter 15.

Figure 3:
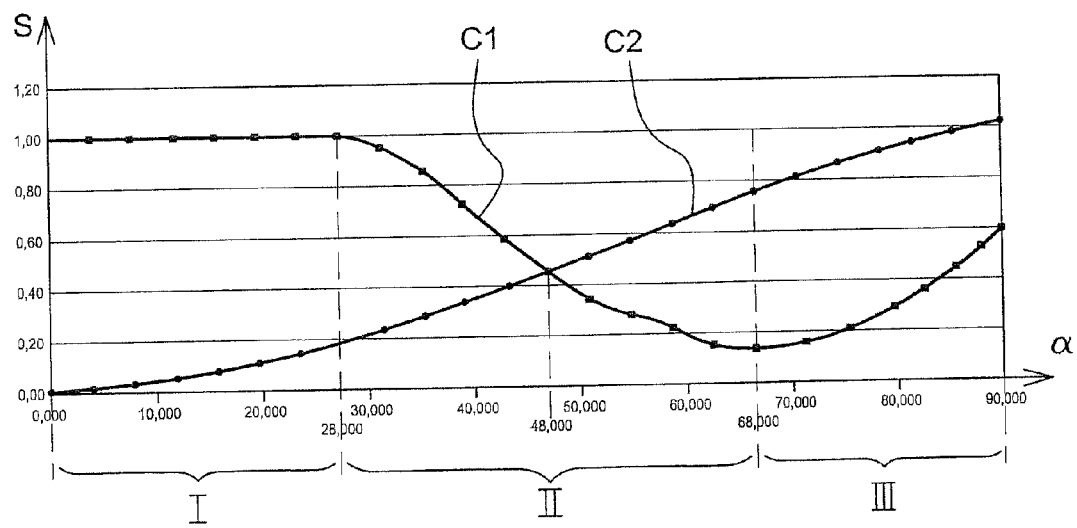
FIG. 3 is a depiction in the form of a graph of the bore section available to the gases at the shutters of the EGR valve of FIG. 1 as a function of the angular position of the EGR gas flow rate regulating shutter for implementing the preferred embodiment of the control method of the invention.

The law governing the dynamics with which the shutters 15, 16 are driven by the motor 18 is depicted by the graph of FIG. 3 which on the ordinate axis represents the bore section S available to the gases at the shutters 15, 16 (curve C1 for the bore section available to the air at the air shutter 15 and curve C2 for the bore section available to the EGR gases 16 at the EGR gas shutter 16), as a function of the angle a of rotation of the EGR shutter 16 (which is in fact a linear function of the angle of the shaft 19 of the motor 18 with which it meshes directly). The bore sections S available to the gases are expressed as a percentage of the respective maximum bore section. It will be noted that the curves C1, C2 are not straight line portions because the bore section S is not a linear function of the rotation of the shafts 19, 20, 21 of the mechanism.

As can be seen in FIG. 3, in a first region I which in this instance extends between 0° and 28° of opening of the EGR shutter 16, only the EGR shutter 16 is driven in rotation, from its closed position to its part-open position open by 28°. The level of EGR therefore increases with the opening of the EGR shutter 16. When the gearing is in the position of FIG. 6a (with the ring gear 27 of the EGR shutter 16 resting against the first end stop 33), the EGR shutter 16 is closed, the air shutter 15 however being open; this is the mode of operation described with reference to FIG. 2a and corresponding to the first point (on the left) in FIG. 3; the remainder of the curve of FIG. 3 in this first region I corresponds to the rotational driving of the EGR shutter 16 without rotational driving of the air shutter 15 (corresponding to the mode of operation described with reference to FIG. 2b), the drive surface 30 of the drive wheel 29 for driving the air shutter 15 having not come to rest against the driving finger 31.

In a second region II extending in this instance between 28° and 68° of opening of the EGR shutter 16, the two shutters 15, 16 are driven in rotation, the EGR shutter 16 continuing its progressive opening and the air shutter 15 on the other hand being concomitantly progressively closed by the rotational driving of its drive finger 31 by the drive surface 30 of the wheel 29; this is the mode of operation described with reference to FIG. 2c. The position of the gearing of FIG. 6b corresponds to the EGR shutter 16 being wide open and the air shutter 15 being fully closed, i.e. to the last point (to the right) of FIG. 3, in which the EGR shutter 16 is opened to 68°; this position corresponds to the ring gear 27 that drives the EGR shutter 16 resting against the second end stop 34; this is the mode of operation described with reference to FIG. 2d. It will be noted in FIG. 3 that at this point of closure of the air shutter 15 the bore section available to the air is non-zero because the clearance J around this shutter 15 leaves a passage available to a leakage air current.

The angle of opening of the EGR shutter 16 (here 28°) corresponding to the start of this second region II—i.e. to the start of the air shutter 15 being driven towards its closed position—is regulated through the position of the finger 31 with respect to the drive surface 30 of the wheel 29 and therefore using the end stop 32 for this finger 31; this is in effect the start of rotational drive of the air shutter 15 and therefore of the finger 31 which is synonymous with the start of this region II. According to the invention, this angle is chosen between 25° and 35° and in this instance is equal to 28°.

A third area III shaded in gray in FIG. 3 (and also depicted in FIG. 4) will also be noted and this area corresponds to the values not adopted by the EGR valve 9 described, i.e. to the bore sections that would have corresponded to continued rotation of the ring gear 27 that drives the EGR shutter 16 beyond the second end stop 34. It is by setting the position of this end stop 34 that the angle at which the EGR shutter stops, in this instance 68°, is regulated.

Figure 4:
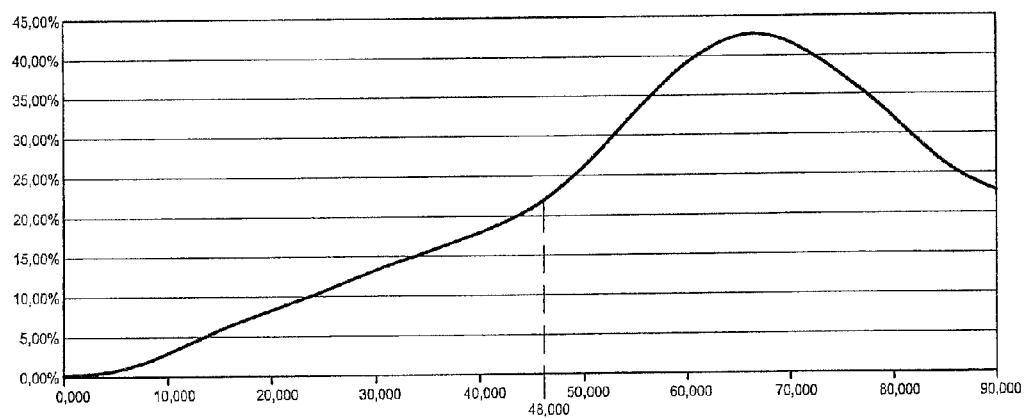
FIG. 4 is a depiction in the form of a graph of the level of EGR as a function of the angular position of the EGR gas flow rate regulating shutter in the context of implementation of the preferred embodiment of the control method of the invention.
Figure 5A:
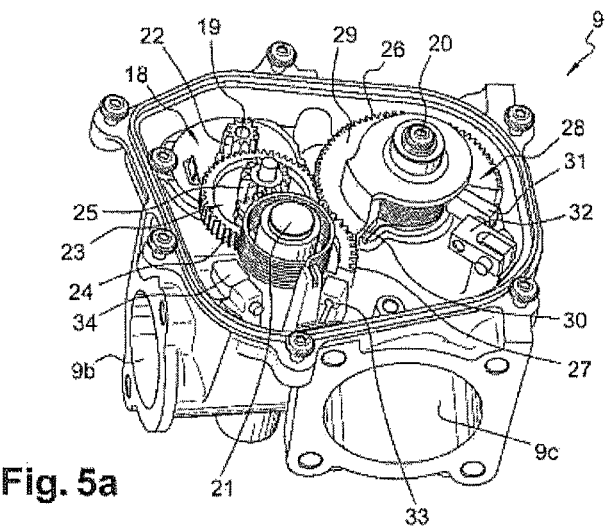
FIGS. 5a and 5b are perspective depictions of the EGR valve of FIG. 1.
Figure 5B:
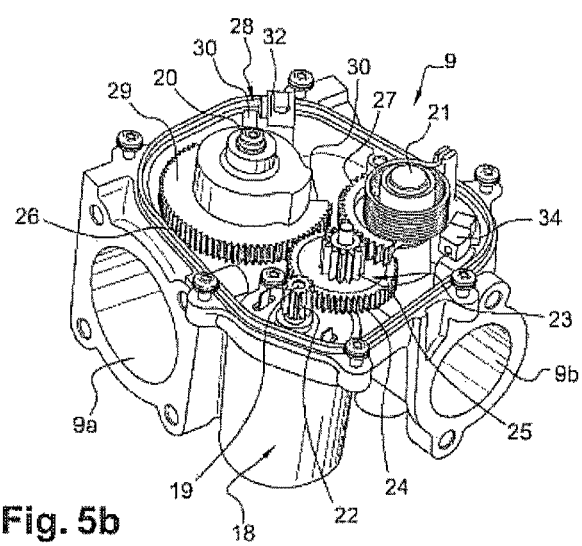
Figure 6A:
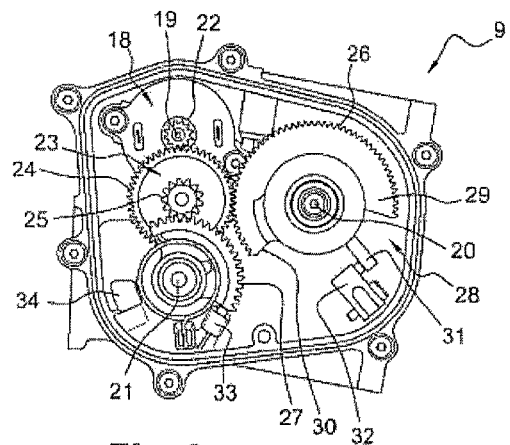
FIGS. 6a and 6b are views from above of the EGR valve of FIG. 1, in two different modes of use.
Figure 6B:
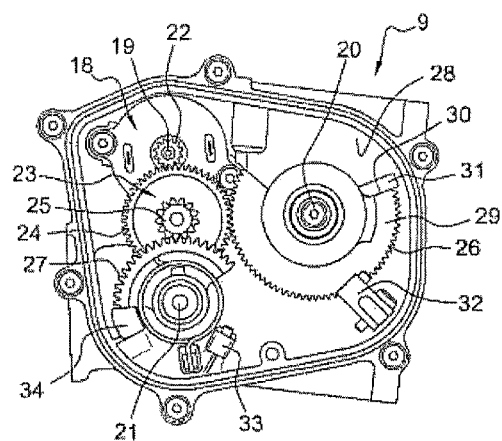

The choice to initiate closure of the air shutter 15 above and beyond an angle of opening of the EGR shutter 16 of between 25° and 35° affords the advantage of a level of EGR that is increasing and has an increasing derivative throughout the range of opening of the EGR shutter 16, as can be seen in FIG. 4. Between 0° and 48° of opening the EGR shutter 16, the level of EGR increases in a relatively linear manner as a function of the opening of the EGR shutter 16. At 48°, the gradient of the curve changes, increasing more sharply; this value corresponds to the intersection of the bore-section curves C1, C2 of FIG. 3. However, whatever the point on the curve (except for the first few degrees in this instance), the second derivative of this curve is practically always positive or zero. It is thus easily possible to control the level of EGR through direct control of the opening of the EGR shutter 16.

To sum up, there are three main phases or modes of operation for the opening of the shutters 15, 16 of the EGR valve 9:
- a first mode I in which the rotation of the motor 18 drives the opening or closing of the EGR shutter 16, the air shutter 15 remaining wide open, and
- a second mode II in which the rotation of the motor 18 drives the opening of the EGR shutter 16 concomitantly with the closing of the air shutter 15, the opening of the air shutter 15 being commenced when of opening of the angle the EGR shutter 16 passes through an angle of between 25° and 35°, in this particular instance 28°.

The way in which the EGR valve 9 operates, (however it is embodied) is, incidentally, conventional, as is that of the engine M and its intake 2a, exhaust 2b and recirculation 2c circuits. All is regulated by the ECU thanks notably to the measuring of the pressure difference across the EGR shutter 16 which measurement is made possible and easier by the control method and the valve 9 of the invention.

The invention has been presented in relation to a valve fitted with shutters but the valve could of course be fitted with other shut-off means such as butterflies. Moreover, as was already envisioned earlier, the three-way valve could be replaced by two simple valves.

The invention has been described in relation to some preferred embodiments, but it goes without saying that other embodiments are conceivable. In particular, the features of the various embodiments described can be combined with one another, if there are no compatibility issues in so doing.

The invention claimed is:

1. A method of controlling an exhaust gas recirculation circuit of a motor vehicle internal combustion engine, the combustion engine being connected to an air intake circuit and to an exhaust gas circuit connected to the air intake circuit by the exhaust gas recirculation circuit, a first valve regulating an airflow rate upstream of the recirculation circuit and a second valve regulating a flow rate of recirculated exhaust gases in the recirculation circuit, the method comprising:
   with the first valve open, progressively opening the second valve; and
   progressively closing the first valve concomitantly with the opening of the second valve when the second valve is opened by an angle greater than a predetermined angle, wherein the predetermined angle is between 25° and 35°.

2. The method as claimed in claim 1, wherein when the opening of the second valve is interrupted at an angle of opening of between 65° and 85°, the first valve is fully closed.

3. The method as claimed in claim 1, wherein when the first valve is closed, the first valve allows a leakage air current to pass.

4. The method as claimed in claim 1, wherein the first and second valves are arranged in a three-way valve comprising a first inlet port with the first valve, a second inlet port with the second valve, and an outlet port communicating directly or indirectly with an intake manifold that admits gas to the engine.

5. The method as claimed in claim 4, in which, with the three-way valve having a single drive motor for driving the first valve and the second valve, the three-way valve has at least two modes of operation, comprising:
   a first mode in which a rotation of the motor drives the opening or closing of the second valve, without driving the first valve which is open, and
   a second mode in which the rotation of the motor drives the closing of the first valve concomitantly with the opening of the second valve, wherein the closing of the first valve begins when an angle of opening of the second valve passes through an angle of between 25° and 35°.

* * * * *